United States Patent
Ma et al.

(10) Patent No.: US 9,025,830 B2
(45) Date of Patent: May 5, 2015

(54) LIVENESS DETECTION SYSTEM BASED ON FACE BEHAVIOR

(75) Inventors: Chih-Chao Ma, Taichung (TW); Yi-Hsin Liu, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 483 days.

(21) Appl. No.: 13/354,891

(22) Filed: Jan. 20, 2012

(65) Prior Publication Data

US 2013/0188840 A1 Jul. 25, 2013

(51) Int. Cl.
*G06K 9/00* (2006.01)
(52) U.S. Cl.
CPC ........ *G06K 9/00261* (2013.01); *G06K 9/00221* (2013.01); *G06K 9/00906* (2013.01)
(58) Field of Classification Search
None
See application file for complete search history.

(56) References Cited

U.S. PATENT DOCUMENTS

| | | | |
|---|---|---|---|
| 2007/0154070 A1* | 7/2007 | Kondo et al. | 382/107 |
| 2011/0188712 A1* | 8/2011 | Yoo et al. | 382/118 |
| 2012/0098992 A1* | 4/2012 | Hosoe | 348/222.1 |
| 2012/0141017 A1* | 6/2012 | Krupka et al. | 382/159 |
| 2012/0257797 A1* | 10/2012 | Leyvand et al. | 382/118 |

* cited by examiner

*Primary Examiner* — Randolph I Chu
(74) *Attorney, Agent, or Firm* — McClure, Qualey & Rodack, LLP

(57) ABSTRACT

A liveness detection method comprising: receiving plural pictures of a video stream comprising a face and an adjacent background; determining motion of the face and the background, the motion determined over the plural pictures; comparing the motion between the face and the background; and determining whether the face corresponds to an actual, live user or an image of the user based on the comparison, the determinations performed by a processor.

14 Claims, 9 Drawing Sheets

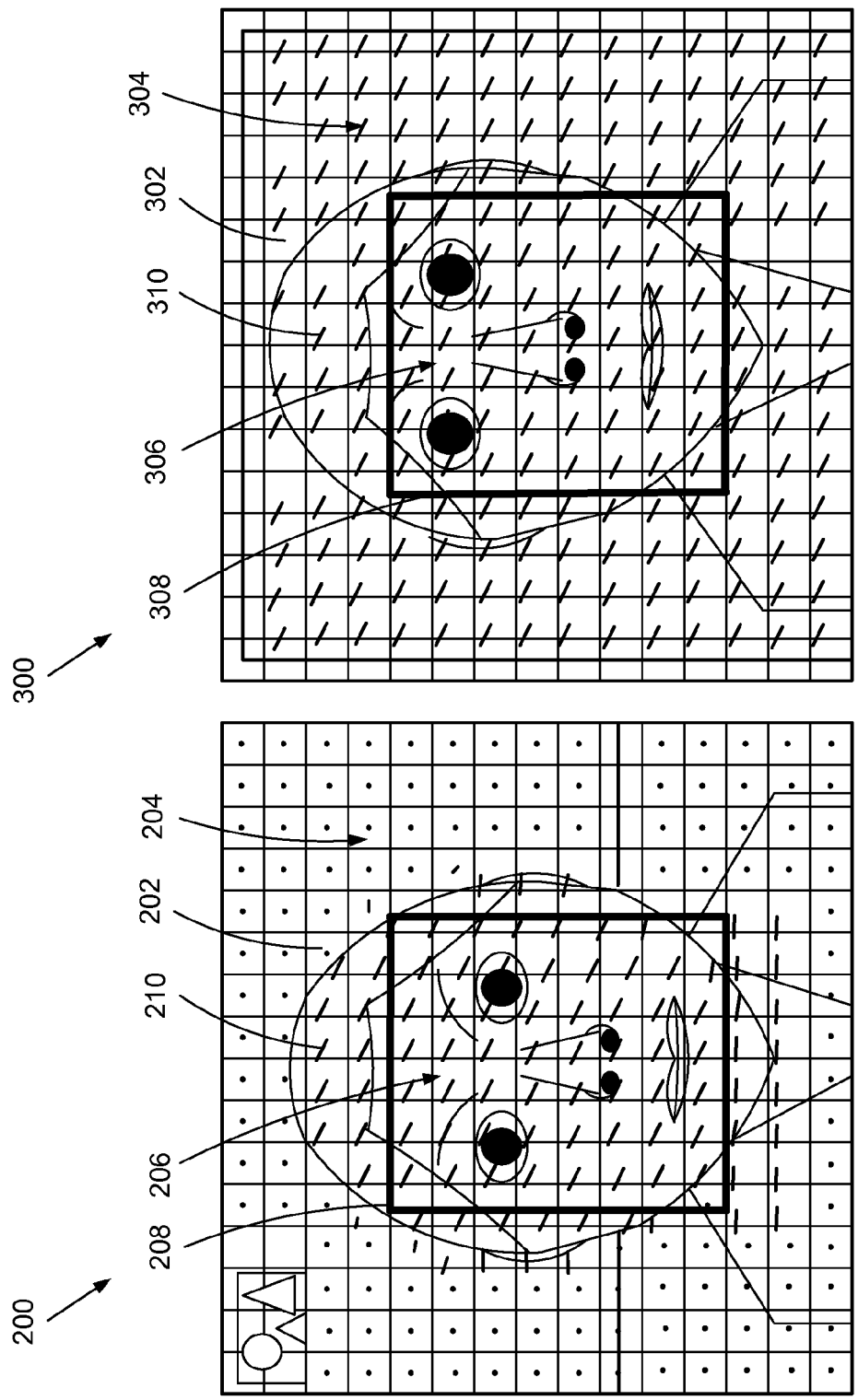

LIVENESS DETECTION SYSTEM BASED ON FACE BEHAVIOR

TECHNICAL FIELD

The present disclosure is generally related to authentication systems.

BACKGROUND

Certain authentication systems, such as those found in various logon processes for network or computer systems, may be based at least in part on the use of biometric information to authenticate a user. Biometric information generally includes physiological features of a user seeking access to the system and/or behavioral features of the user. For instance, physiological features include facial features, fingerprints, and/or retina features. Behavioral features include the behavior of the user, such as voice, gait, among other features.

In authentication systems based on facial recognition, unauthorized users may seek to circumvent these safeguards by using an image (e.g., physical photo, electronic image, such as a cell phone image, etc.) of the authorized user to spoof the system into permitting access. Hence it is important for authentication systems to distinguish between the actual user and one pretending to be the user.

SUMMARY

In one embodiment, a method comprising: receiving plural pictures of a video stream comprising a face and an adjacent background; determining motion of the face and the background, the motion determined over the plural pictures; comparing the motion between the face and the background; and determining whether the face corresponds to an actual, live user or an image of the user based on the comparison, the determinations performed by a processor.

In another embodiment, a method comprising: receiving from an image capture device plural pictures of a video stream comprising a face; prompting a motion of a first portion of the face of a user; determining if there is motion within the first portion of the face, the motion determined over the plural pictures; and determining whether the face corresponds to an actual, live user or an image of the user based on the determination of motion, the determinations performed by a processor.

In another embodiment, a system comprising: an image capture device configured to receive plural pictures of a video stream comprising a face and an adjacent background; and a computing device comprising a processor that is configured to: determine motion of the face and the background, the motion determined over the plural pictures; compare the motion between the face and the background and within at least a portion of the face; and determine whether the face corresponds to an actual, live user or an image of the user based on the comparisons.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a schematic diagram that illustrates an embodiment of a process for dividing a face and background of a human being, captured by an image capture device, into plural sub-units, each of which is evaluated using motion estimation over a sequence of plural pictures in a video stream.

FIG. 3 is a schematic diagram that illustrates an embodiment of a process for dividing a face and background of an image of a human being, captured by an image capture device, into plural sub-units, each of which is evaluated using motion estimation over a sequence of plural pictures in a video stream.

DETAILED DESCRIPTION

Figure 1:
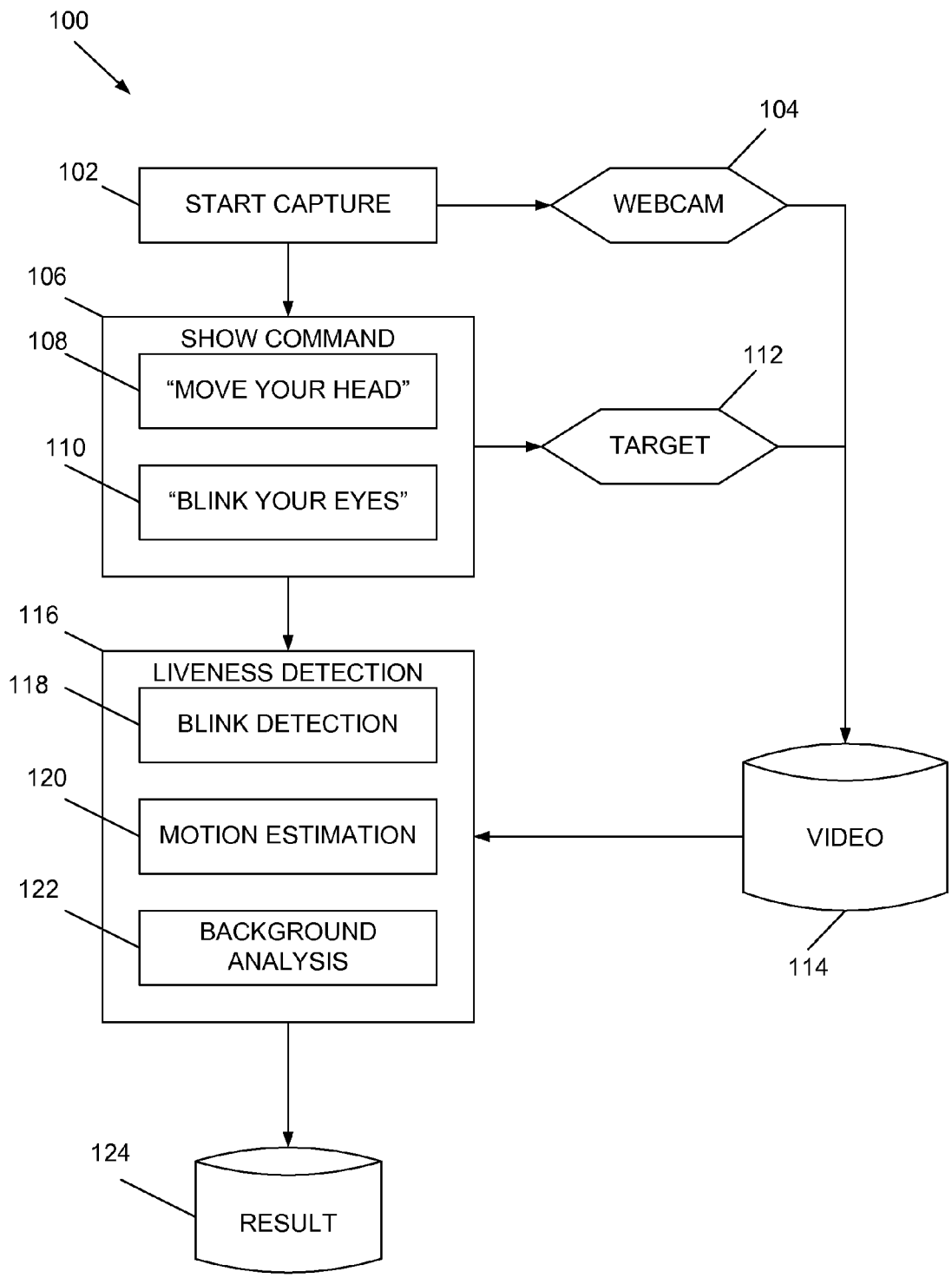
FIG. 1 is a flow diagram depicting an example embodiment of a liveness detection process that determines whether a target of an image capture device is an actual, live user or an image of the user.

Disclosed herein are certain embodiments of an invention that comprises a liveness detection system and method that differentiates between a live human being and a corresponding image. For instance, in authentication systems for network or computing systems, particularly those authentication systems that use logon procedures that involve face recognition, an unscrupulous user (e.g., referred to herein also as an invader) may seek to spoof an authorized user to gain access to the network or computing system. One method an invader may use is to present an image (e.g., photograph, electronic image, such as from a display screen of a communications device) of an authorized user to an image capture device (e.g., web cam, video camera, etc.) of the authentication system.

To counter such attempts by an invader, one embodiment of a liveness detection system detects a face of a user, in range of an image capture device of an authentication system (e.g., such a user also referred to herein as a target), and a background adjacent to the face, determines the associated size and location of the face and background, computes motion over plural pictures or frames (e.g., pictures and frames are used herein interchangeably, with the understanding that certain embodiments contemplate both interlaced and progressive types of scanning formats), and compares the motion between the face and the background. Since an image tends to show like-motion between the face and background and live image capture of an authenticating user tends to show movement of the face relative to a static surrounding background, the liveness detection system uses the determined motion differences to make a determination as to whether the user (e.g., the target) attempting to access the network or computing system is a live human being or merely an image of a live human being. Such a determination is also referred to herein, generally, as a liveness determination (e.g., a determination of whether the target is a real, live human being or an image of the human being).

At a time corresponding to this determination (e.g., before liveness determination, during, or after), the authentication system may access a database of stored images to further assess whether the facial features of the target match (e.g., threshold degree of matching) the facial features of the stored image. A match results in permitting access to the computing system or network (or at least permitting further authentication in some implementations).

Some embodiments may implement other, or in some embodiments, additional measures to determine or substantiate liveness, respectively. A liveness detection system commands and/or induces a user to make a specified action or expression by direct command or induction. Commands may be implemented by way of textual messages presented across a display screen of the authentication system that request that the target turn or move his or her head, or blink his or her eyes, among other possible commands. Commands may also be presented verbally, or using non-textual graphics. Induction may be implemented by way of causing a graphic, such as a displayed box-frame, to move across the screen to induce the target to position his or her face within the frame, or by causing a flash (e.g., by a coupled device or via action presented on a screen of the display device), which results in an eye blink by the target, among other methods of inducement. In some embodiments, a combination of commands and inducement may be implemented. Following these measures, the liveness detection system determines if the target is a real human being or an image depicting a human being by analyzing the information related to the specified action or expression, such as whether there is a change in facial expression (e.g., eye blink, smile, frown, etc.) or head (and hence face) movement.

Digressing briefly, for conventional authentication systems based on face recognition, one security problem arises from the inability to differentiate between a live human being and an image of the human being in the input data. If an authentication system does not have this ability of differentiation, then an invader may deceive the system by using an image depicting an authenticated user. It is a difficult problem to differentiate between a human being and an image from static image data, but it is easier to differentiate between a three-dimensional (3D) face and a two-dimensional face image from captured video by analyzing the facial action or expression. For instance, one mechanism for liveness detection is to use a 3D or infrared camera to identify the depths of a stereoscopic-based face and plane image. However, it is a more difficult problem if a normal webcam is used. When an authentication system lacks stereoscopic information, certain embodiments of a liveness detection system can be used, which differentiates according to the movement of a target in the video. Both the real (e.g., live) face and the inanimate image can move in the video, but their respective movements produce different changes among the video pictures. For instance, when a real human moves his or her face in front of the image capture device, the background region is static. In contrast, when an image moves, the face in the image and surrounding background region move together. Hence, certain embodiments of a liveness detection system can differentiate between a live human being and an image according to these differences in motion.

However, in some circumstances, the target may not move enough (e.g., through head movement or changes in facial expression) when attempting authentication. In the extreme case, if the target freezes in front of the camera without making any actions, it is difficult for an authentication system to differentiate between the user and a static image. That is, the captured video in such scenarios comprising a face lacking in variation is similar to a static face image, which makes it difficult for an authentication system to collect and assess the data needed to enable differentiation. In this case, the authentication system is facing a dilemma: if the system determines the static face as a real human being, then it is easy for an invader to deceive the system by using an image. On the other hand, if the system determines the target as an image, it is hard for some users to pass the system, because they do not make enough movement. This problem may cause inconvenience and/or confusion for these users. Certain embodiments of liveness detection systems address these authentication issues by prompting the target to make certain, expected actions, and then identify the differences between the content of actions performed by a real human being and by an image. Accordingly, certain embodiments of a liveness detection system provide an advance over conventional authentication systems in the way of precision, efficiency, and/or security in the authenticating process.

Having broadly summarized certain features of liveness detection systems and methods of the present disclosure, reference will now be made in detail to the description of the disclosure as illustrated in the drawings. While the disclosure is described in connection with these drawings, there is no intent to limit the disclosure to the embodiment or embodiments disclosed herein. Although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Attention is directed to FIG. 1, which illustrates one embodiment of a process 100 for liveness detection, such as in an authentication system. It should be appreciated within the context of the present disclosure that the process 100 depicted in FIG. 1 is for illustration, and that other embodiments are contemplated to be within the scope of the disclosure, including embodiments using a subset of the illustrated processes, or using a variation in the order of processing, among other variations. In general, the liveness detection process 100 prompts motion from the target by commanding the target to make a specific action (e.g., behavior) (though not shown in FIG. 1, and/or inducing the target to make the specific action, as explained further below). The liveness detection process 100 receives a video stream comprising plural pictures that include information pertaining to the target's behavior, collects the information, and uses the information to differentiate between live human behavior and inanimate objects. In other words, based on the information, the liveness detection process 100 determines if the target in the captured video is a real human being or an image depicting a human being.

The liveness detection process 100 starts image capture (102) using an image capture device, such as a webcam (104). A target is typically positioned in close proximity to the webcam, with the resulting image displayed live on a display screen of a computing device, such as a computer screen coupled to the webcam. In one embodiment, the liveness detection process 100 presents on the display screen of the computing device, shown to the target, a command (106) that attempts to prompt motion by the target. For instance, the command may be embodied in the form of a text message presented across the display screen, such as "Move your head" (108) or "Blink your eyes" (110). In some embodiments, other, non-textual graphics may be used to prompt action, such as a graphic of a face moving his or her head or blinking his or her eyes. In some embodiments, the display screen message or command may be omitted, and the commands may be embodied as verbal messages (e.g., through speakers coupled to the computing device).

The process 100 further includes the webcam capturing a video of the target (112) containing the face movement or facial expression following the command. The resulting video stream, comprising the plural pictures of the captured face and background, is stored (e.g., buffered) in a storage device (e.g., memory, persistent storage, etc.) (114), and accessed to perform liveness detection (116). Liveness detection (116) includes the execution of one or more known algorithms to perform blink detection (118), motion estimation (120), and/or background analysis (122), as explained further below in association with FIGS. 4-5. Since the face in an image does not show an eye blinking like a real human user, and the face and the background region in an image move together when the image moves, the liveness detection process 100 may collect required differentiation information for these algorithms. The liveness detection process 100 produces a result (124) that includes a determination of whether the target in the video is a real human being, or only an image depicting a human being. From this information, an authentication system may perform other measures before allowing access, though in some embodiments, such measures may be performed at least in part before the liveness determination.

It should be appreciated within the context of the present disclosure that one or more of these processes may be implemented in a different order than that illustrated in FIG. 1. For instance, the image acquisition (capture) process may be commenced at the time of presenting the command (106). Further, though a webcam is illustrated as an example image capture device, other image capture devices not configured for use with the Internet may be used, such as a camcorder. Also, one or more of these processes may be omitted in some embodiments, such as the use of only one of the commands (108) or (110) or the omission of the commands (106) altogether.

Having described an example embodiment of a liveness detection process 100, attention is directed to FIGS. 2-3, which illustrate the example motion estimation process 120 implemented by certain embodiments of a liveness detection system. After the liveness detection system presents one or more commands (and/or provides an induction, as explained further below), or after video capture in some embodiments without the use of commands and/or induction, the liveness detection system can implement a process of differentiation according to the received video pictures. For face motion or movement (motion and movement used interchangeably herein), the main difference between a real human being and an image is the magnitude of relative movement. When a target moves his or her face in front of the camera, the background region is static. But if the target (e.g., an invader) holds an image (e.g. the screen picture of a cell phone or another device) of an authorized user and moves the image in front of the camera, then the background and the face in the image will move together. Moreover, the movement of face, background, and image picture are in agreement.

Accordingly, one embodiment of a liveness detection system obtains information of movement using motion estimation to analyze the pictures in the video. The liveness detection system receives plural (e.g., two) pictures close in time, and divides the pictures into many sub-units (e.g., square regions, such as macroblocks, though the regions may be of rectangular form in some embodiments). Then for each sub-unit (or in some embodiments, for each group of sub-units), the liveness detection system estimates the moving direction and magnitude between the two pictures. To compare the movements of the face and background, the liveness detection system determines the location and size of the face. For instance, the liveness detection system may implement well-known face detection algorithms to find discriminating information of the face. The liveness detection system may also obtain information of the background, such as through the use of well-known object segmentation, or in some embodiments, via use of head detection algorithms to filter out the possible foreground region and choose the region closest to the face from the remaining region. According to the result of motion estimation, the liveness detection system computes the moving direction and magnitude of the face and the background. If the moving directions and magnitudes of the face and background are similar enough (e.g., meet or exceed a threshold degree of similarity), then the liveness detection system determines that the target in the input video is an image, otherwise, the liveness detection system determines that the target is a real human being. Note that one having ordinary skill in the art in the context of the present disclosure may use other criteria, such as determining whether the movement and direction between face and background are different enough (e.g., per a given threshold). Then (if different enough) the liveness detection system determines that the target in the input video is a real human being, otherwise the system determines that the target is an image.

Figures 4, 5:
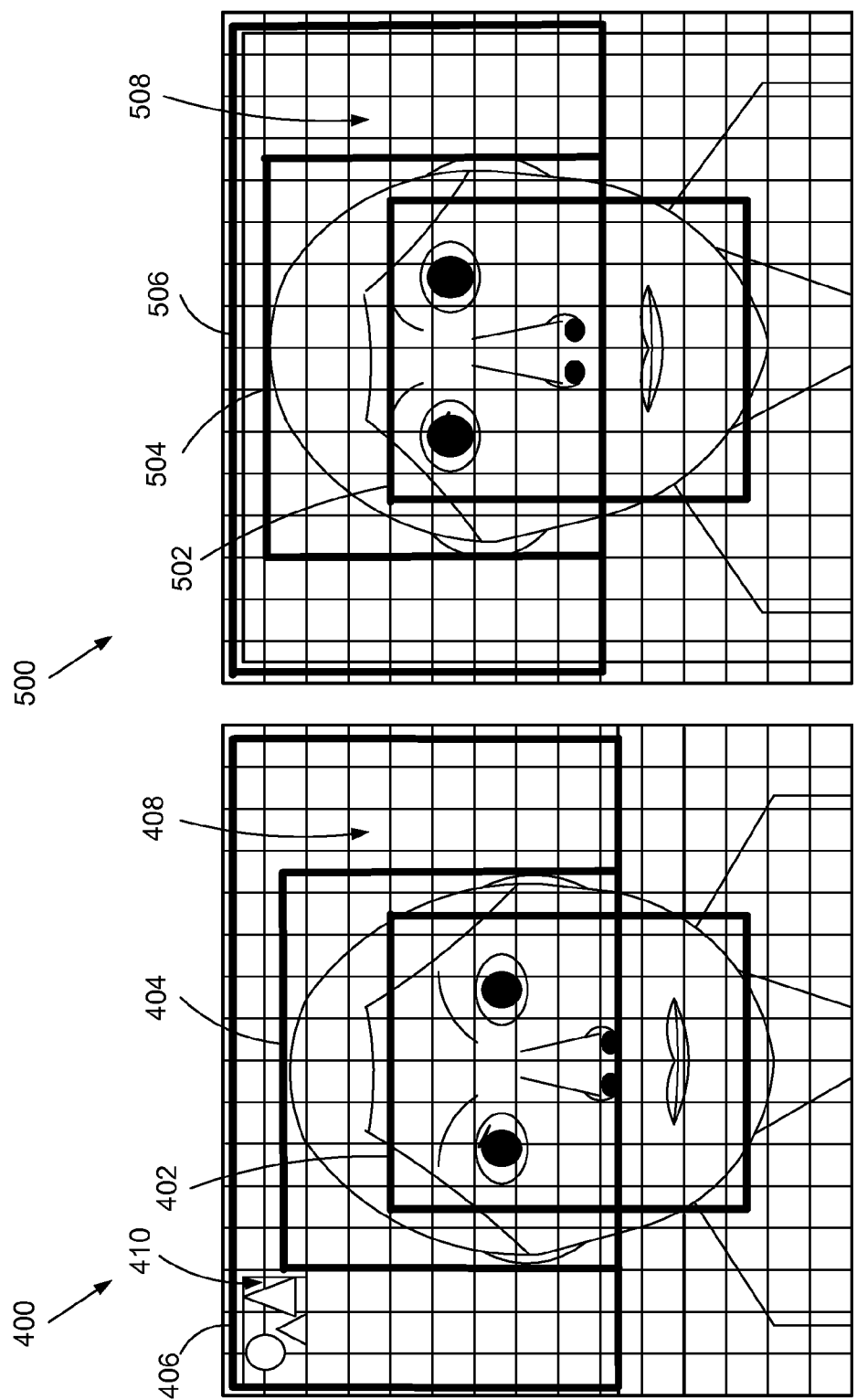
FIGS. 4-5 are schematic diagrams that illustrate a method for determining a background region.

Referring to FIGS. 2 and 3, shown are schematic diagrams illustrating the above-described motion estimation process 120. In FIG. 2, a picture 200 is shown (and in FIG. 3, a picture 300), divided up by the liveness detection system into plural sub-units, such as sub-unit 202. The sub-units 202 are depicted as squares of a given size, though it should be appreciated within the context of the present disclosure that other sizes may be used, or rectangles may be used in some embodiments. The picture 200 comprises a background (or equivalently, background region) 204 and a face 206. The face 206 is shown bounded by a bounding region 208 (e.g., depicted as a square in this example, though other geometrical formats may be used covering substantially the same or different areas). Note that there may be one or more bounding regions (e.g., a second bounding region for the background or a portion thereof). For instance, and referring to FIGS. 4-5, shown is a reproduction of the pictures 200 and 300 from FIGS. 2-3 with additional bounding regions as shown by pictures 400 and 500, respectively. Discussion of like features shared between FIGS. 2-3 and 4-5 are omitted here except for purposes of further explanation. In FIGS. 4 and 5, the bounding regions include face bounding regions 402 and 502, head bounding regions 404 and 504, and background determining bounding regions 406 and 506. In the embodiment depicted in FIGS. 4-5, the background regions 408 and 508 bounded by background determining bounding regions 406 and 506 are each configured as an inverted "U," though not limited to such a configuration. To detect the background regions 408 and 508, the respective face region (e.g., bounding regions 402 and 502) is detected, and an estimation of each respective head region (bounding regions 404 and 504) is computed based on the detected face regions 402 and 502. Then, the background regions 408 and 508 that are close to the face regions (e.g., bounded by face bounding regions 402 and 502) are determined, with the head regions (e.g., bounded by head bounding regions 404 and 504) substantially excluded. For instance, the background region 408 is determined by computing the difference between the background determining bounding region 406 and the head bounding regions 404. Likewise, the background region 508 is determined by computing the difference between the background determining bounding region 506 and the head bounding regions 504. It is noted that the real human being is shown in FIG. 4, which has a picture 410 of a sun and mountains in the background region 408, and the image of a human being is presented in FIG. 5 (which omits the picture in the background).

Referring back to FIGS. 2 and 3, for each sub-unit 202, the magnitude and direction of motion is computed for the area of the picture bounded by the sub-unit 202 in comparison to at least one other picture, as is known in motion estimation. Hence, each sub-unit 202 is associated with a motion vector 210 (e.g., represented as a line or dot in the sub-unit 202) representing the direction and magnitude of the motion. In FIG. 3, a picture 300 is similarly divided up into sub-units 302, with the picture 300 also including a background 304, face 306, bounding region 308, and motion vectors 310 as similarly described above for FIG. 2. In FIG. 3, it is observed that most of the motion vectors 310 for the background 304 have a similar movement to the face 306 (e.g., diagonal motion vectors of like-magnitude), so the target captured in this picture 300 is determined by the liveness detection system to be an image (e.g., an invader). In contrast, in FIG. 2, it is observed that the motion vectors 210 for the background 204 have a different movement compared to the face 206 (e.g., diagonal motion vectors 210 in the majority of the face sub-units 202 compared to primarily dots in the background 204), so the target captured in this picture 200 is determined by the liveness detection system to be a real human being (e.g., live user) given their lack of similarity in motion vectors when compared to the background 204.

In addition to, or in some embodiments in lieu of, a determination of movement of the face relative to the background, an evaluation by the liveness detection system of a facial expression may be used to differentiate between a real, live human being and an image. One difference between video of a live human being and an image is with regard to facial features. In other words, it is unlikely for there to be a change in facial features when capturing over plural pictures an image held by a user. In embodiments of a liveness detection system that use facial expressions in its algorithm, one condition to determine the target as a real, live human being is the detected presence of the facial expression. So, one embodiment of a liveness detection system uses a facial expression detection algorithm to detect the presence of a facial expression. Since different facial expressions impose different changes in the facial features, the detection algorithms of those facial expressions may also be different.

Figure 6:
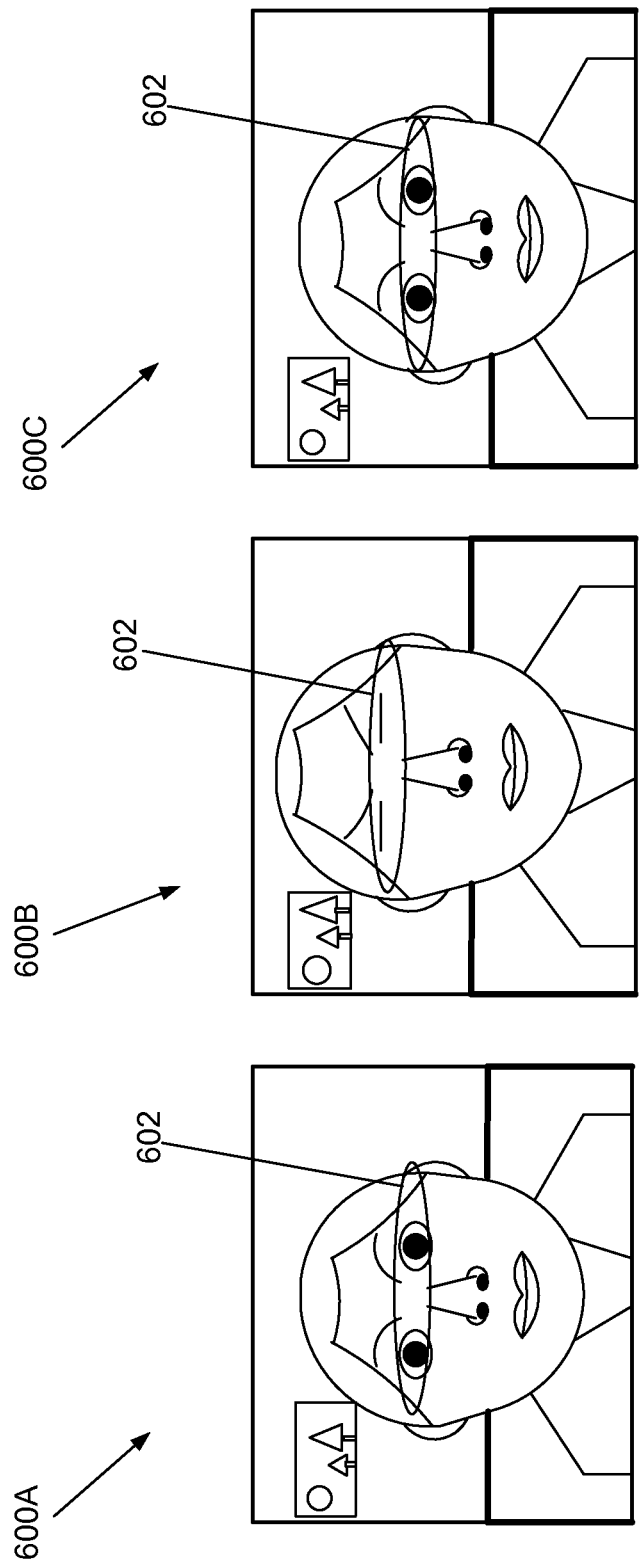
FIGS. 6A-6C are schematic diagrams that illustrate an embodiment of a process for the determination of motion within a portion of a face by detecting an eye blink.

For example, eye-blink detection algorithms check the eye region, and smile detection algorithms check the mouth region. One example eye-blink detection algorithm checks the variation of eye regions in every picture of the captured video. With reference to FIGS. 6A-6C, shown is an illustration of plural pictures 600 (e.g., 600A, 600B, and 600C) of a captured video stream revealing an eye blink for a given target. It is noted that an eye-blink algorithm may be considered a sub-category of motion estimation directed to regions within the face (e.g., and not necessarily with respect to the background motion). From that perspective, the eye blink algorithm may be performed by using a bounding region 602 that focuses on a detected region (in this example, the eye region of the face, though other regions in addition to or in lieu of the eye region may be bounded, such as the mouth, eyebrows, forehead, etc.), and sub-divided into plural sub-units (not shown in FIGS. 6A-6C) to compare motion within the particular bounded region between the plural pictures of a given picture sequence. Note that the bounding region 602 is depicted as an ellipse, with the understanding that other geometric configurations may be used in some embodiments covering substantially the same, or less or more of the region. In FIGS. 6A and 6C, the eyes bounded by bounding region 602 are depicted as wide open, whereas in FIG. 6B, the target has blinked as shown by the closed eyes in the bounding region 602. In one embodiment, if the captured video has some period with a large variation in movement in the eye region (e.g., over the span of three pictures in the illustrative example shown in FIGS. 6A-6C), and small or no variation in other face regions at the same time, then the liveness detection system determines that an eye blink is present in the period. In some embodiments, variations in regions other than those bounded by the bounding region 602 are not considered, and hence the variation in eye movement alone is used to make a determination. Since image acquisition in the same period (e.g., span of time) of an image will not reflect such behavior, the detected presence of one or more eye blinks (from a single eye or both eyes) can be used to determine the target as a real, live human being. A similar approach may be used for other facial expressions in other regions of the face.

Figure 7:
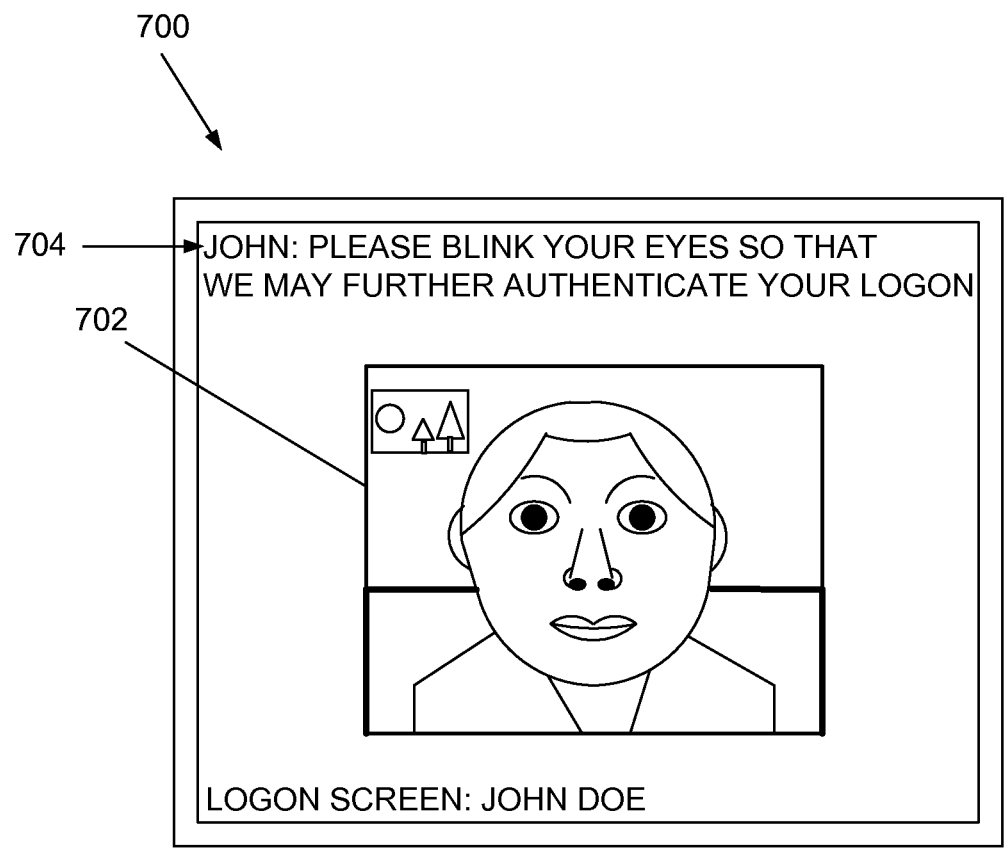
FIG. 7 is a screen diagram that illustrates an embodiment of a process for prompting user motion to enable the determination of motion of the face.

As noted in the description pertaining to FIG. 1, there may be circumstances where the target does not move or moves in an imperceptible manner, and hence a liveness detection process 100 implemented by an embodiment of the liveness detection system includes the command procedure 106 (FIG. 1) that prompts the target to move his or her face (or move features within the face, such as an eye or eyes). With reference to FIG. 7, shown is a screen diagram of a screen 700 (e.g., on a computer monitor or other display device) that shows a live capture 702 of a video stream pertaining to the target, and a message 704 that prompts the target into some specific action. In this example, the target may already have embarked on the authentication process, entering his or her name (e.g., John Doe), and then the authentication system embarks on the biometric portion (e.g., motion detection followed by facial recognition) with a presentation of the target's entered name on the screen 700. It should be appreciated within the context of the present disclosure that other variations of an authentication process (e.g., pin or password entry, etc.) are contemplated to be within the scope of the disclosure. The message 704 requests the following: "John: Please blink your eyes so that we may further authenticate your logon." It should be appreciated that other specific actions may be requested, such as having the target shift his or her position (e.g., side-to-side, or moving further away or closer), and/or make other facial expressions. Further, the liveness detection system may request several movements to collect sufficient information to enable a determination of liveness, each acting to substantiate the prior determinations (or if done concurrently, to substantiate the determinations based on other requested movements) of liveness (and/or serving as a basis of determining liveness where other determinations are unsatisfactory). As noted above, the message presented by the liveness detection system may be embodied as a voice message or as a combination of a verbal and visual message.

Figure 8:
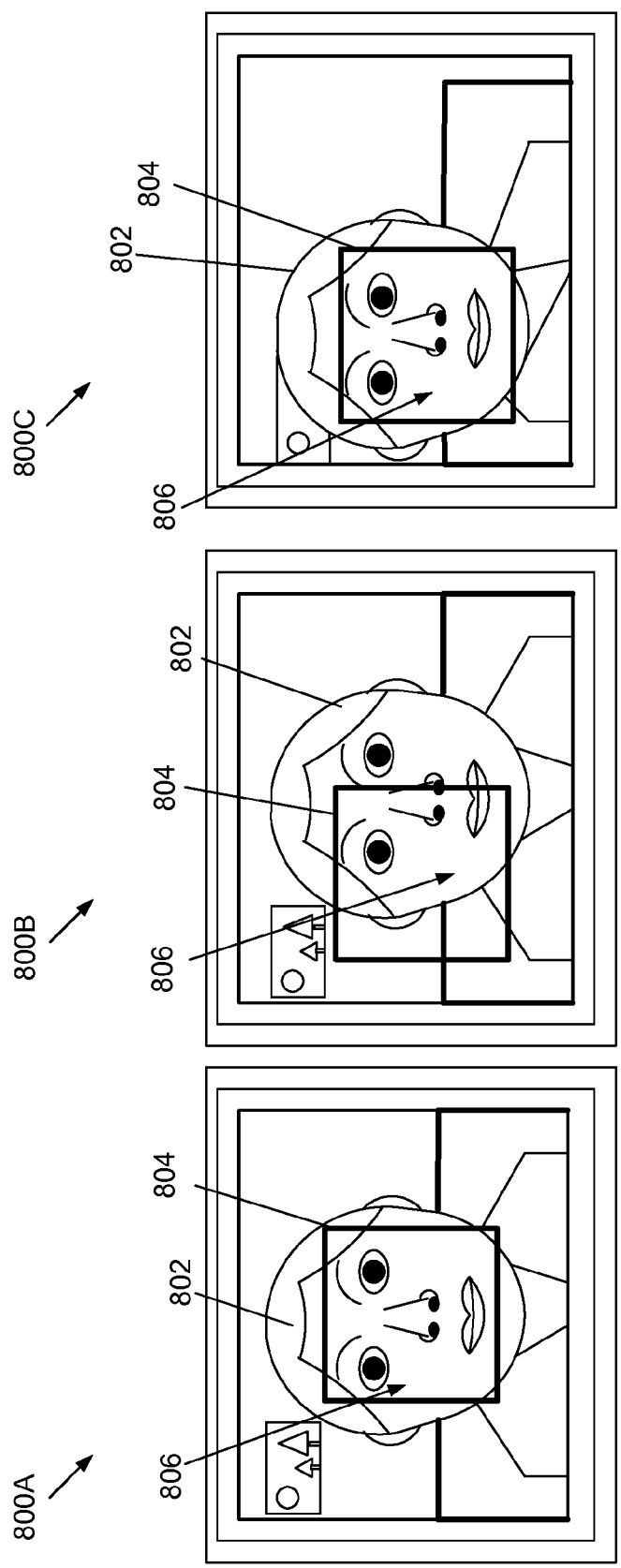
FIGS. 8A-8C are example screen diagrams that illustrate an embodiment of a process for prompting user motion through inducement.

If the target does not notice the command, or does not follow the command as he or she does not understand the necessity of the command, then the command is not enough to guarantee a specific action or behavior of the target. One mechanism that certain embodiments of the liveness detection system may employ is to prompt user motion through induction. The induction may be performed alone, or in some embodiments, together with a message (e.g., direct command). The use of induction increases the probability that the target makes an expected specific action, facilitating the liveness detection system in making a liveness determination. Reference is made to FIGS. 8A-8C, which are screen diagrams depicting a display screen 800 (e.g., 800A, 800B, and 800C) that illustrate an induction process performed by certain embodiments of a liveness detection system. In the example depicted in FIGS. 8A-8C, the liveness detection system attempts to prompt the target to move his or her face. In FIGS. 8A-8C, the target 802, captured by an image capture device, is shown displayed on the screen 800A (FIG. 8A), 800B (FIG. 8B), and 800C (FIG. 8C) with a graphic pattern 804 (e.g., square, though not limited to square geometry) that is moved in a manner to induce the target 802 to position (e.g., follow and align) his or her face 806 within the graphic pattern 804.

For instance, in FIG. 8A, the graphic pattern 804 initially centers itself on the face 806 of the target 802. In some embodiments, the graphic pattern 804 may be positioned elsewhere relative to the center of the face 806. Referring to FIG. 8B, the graphic pattern 804 has been positioned from the center of the target's face (as shown in FIG. 8A) to the target's right side of the face 806. In FIG. 8C, the target 802 has positioned his or her face (and possibly moved his or her chair) to the center of the graphic pattern 804, and by doing so, has satisfied the requirement of a moving face. Note that in some embodiments, the graphic pattern 804 can be designed as a shooting screen of a camera to increase the probability that the user follows the pattern 804. For instance, the shooting screen may comprise a mark (e.g., "+" mark, grid, etc.) that makes the user want or intend to align his or her face with the mark. In other words, the mark may look like an object that appears in a viewing window of a camera (or something like a gun sight grid for aiming purposes). In some embodiments, the liveness detection system may combine the command and induction. For example, the liveness detection system may present the command "Please put your face into the square", and then move the graphic pattern 804 to induce the target 802 to move if, for instance, the target 802 is not currently within the graphic pattern 804.

In some embodiments, the user may be prompted to incur motion (e.g., induced motion) by a non-textual and/or non-verbal external stimuli that causes a reflexive-type movement. For instance, a flash on an image capture device may be triggered by the liveness detection system, causing the user to blink or turn his or her head. As another example, a lighting device (e.g., light-emitting diode (LED), etc.) and/or sound device (e.g., bell, audio tone, etc.) coupled to the liveness detection system may be triggered to draw the user's attention (and hence induce head and/or eye movement). In some embodiments, the display presented to the user may cause a flash or other movement to induce reflexive movement.

Figure 9:
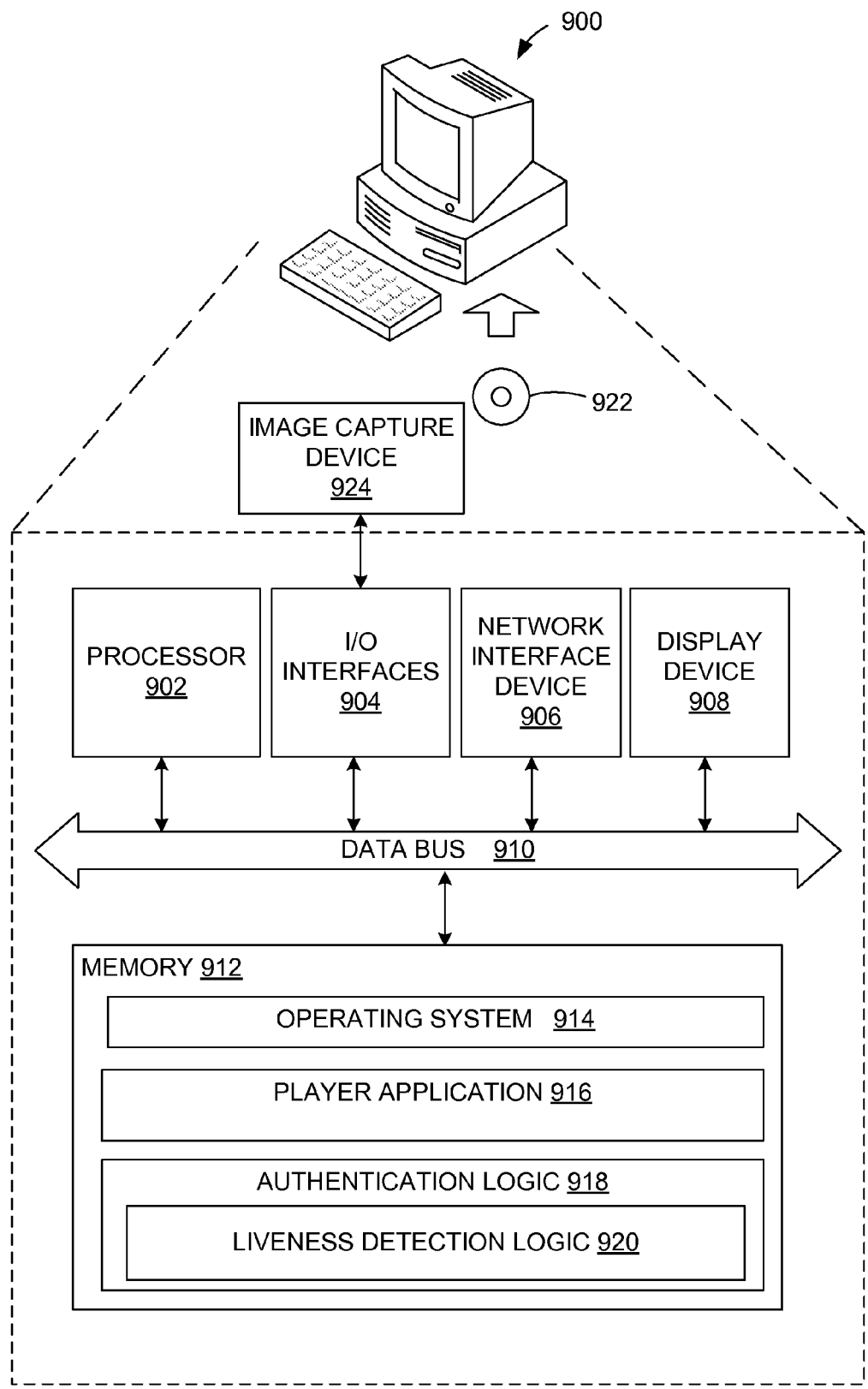
FIG. 9 is a block diagram that illustrates an embodiment of a computing system that includes a liveness detection system.

Having described an example operation of certain embodiments of a liveness detection system and method (e.g., process), attention is directed to FIG. 9, which illustrates an embodiment of a computing system 900. A liveness detection system may be embodied in the entirety of the computing system 900 depicted in FIG. 9, or as a subset thereof in some embodiments. The example computing system 900 is shown as including a personal computer, though it should be appreciated within the context of the present disclosure that the computing system 900 may comprise any one of a plurality of computing devices, including a dedicated player appliance, set-top box, laptop, computer workstation, cellular phone, personal digital assistant (PDA), handheld or pen based computer, embedded appliance, or other communication (wired or wireless) device. In some embodiments, the liveness detection system may be implemented on a network device (also referred to herein as a computing system), similar to the computing system 900, located upstream of the computing system 900, such as a server, router, gateway, etc., or implemented with similar functionality distributed among plural devices (e.g., in a server device and the computing device). An upstream network device may be configured with similar components, and hence discussion of the same is omitted for brevity.

The computing system 900 may, for instance, comprise a processor 902, one or more input/output (I/O) interfaces 904, a network interface device 906, and a display device 908 connected across a data bus 910. The computing system 900 may further comprise a memory 912 that includes an operating system 914 and application specific software, such as a player application 916 in the case of implementing player functionality for the playback of media content, such as video and/or audio (e.g., movies, music, games, etc.). In some embodiments, the player application 916 may be implemented as a software program configured to read and play back content residing on a disc 922 (or from other high definition video sources) according to the specifications defined by standards such as the Blu-ray Disc format specification, HD-DVD, etc. The memory 912 comprises, among other logic (e.g., software), authentication logic 918, which includes in one embodiment, liveness detection logic 920. In some embodiments, the authentication logic 918 may be implemented as a logon procedure (e.g., secured or licensed access) associated with access to content on the disc 922, access to application programs in memory 912, or in some embodiments, implemented as part of a logon procedure specific to access to the computing system 900 (and/or in some embodiments, specific to a remotely-located network device as implemented through a browser program residing in the computing system 900).

In one example operation, an attempted logon by a target to the computing system 900 comprises providing a logon screen on the display 908 and activation of an image capture device 924 coupled to the I/O interface 904 (or integrated in the computing system 900 in some embodiments). The target may enter (e.g., via keyboard or other input devices, including via voice activation) personal information (e.g., his or her name, password, etc.), and then be evaluated for biometric authenticity (e.g., facial recognition, liveness determination, etc.). For instance, the target may sit (or stand) in front of (or in range of) the image capture device 924, and be prompted to incur motion (e.g., of the face or features thereon) by presenting text messages on a screen of the display device 908 (or by other mechanisms as explained above). In some embodiments, the target merely positions himself or herself in front of the screen and a motion determination is made (e.g., without prompting). If motion is not detected in this latter scheme, the liveness detection logic 920 may commence an additional approach, commanding movement by the target and/or inducing movement in the manner as explained above. In some embodiments, entering of personal information (e.g., entering his or her name) does not commence until a liveness determination has taken place. Other variations of an authentication procedure are contemplated to be within the scope of the disclosure. For instance, additional biometric algorithms may be employed in some embodiments. In general, certain embodiments of the liveness detection logic 920 comprises suitable logic to implement the liveness detection process 100 (including the addition of inducement processing) illustrated in FIG. 1, including the command processing 106 (FIG. 1) and liveness detection processing 116 (FIG. 1) and their associated algorithms.

The processor 902 may include any custom made or commercially available processor, a central processing unit (CPU) or an auxiliary processor among several processors associated with the computing system 900, a semiconductor based microprocessor (in the form of a microchip), one or more ASICs, a plurality of suitably configured digital logic gates, and other well-known electrical configurations comprising discrete elements both individually and in various combinations to coordinate the overall operation of the computing system.

The memory 912 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 912 typically comprises the native operating system 914, one or more native applications, emulation systems, or emulated applications for any of a variety of operating systems and/or emulated hardware platforms, emulated operating systems, etc. For example, the applications may include application specific software stored on a computer readable medium (e.g., memory, persistent storage, etc.) for execution by the processor 902 and may include the authentication logic 918 and liveness detection logic 920. One of ordinary skill in the art will appreciate that the memory 912 may, and typically will, comprise other components which have been omitted for purposes of brevity, or in some embodiments, may omit certain components, such as the player application 916.

Input/output interfaces 904 provide any number of interfaces for the input and output of data. For example, where the computing system 900 comprises a personal computer, these components may interface with a user input device, which may be a body part of a viewer (e.g., hand), keyboard, a mouse, or voice activated mechanism. Where the computing system 900 comprises a handheld device (e.g., PDA, mobile telephone), these components may interface with function keys or buttons, a touch sensitive screen, a stylus, body part, etc. The input/output interfaces 904 may further include one or more disc drives (e.g., optical disc drives, magnetic disc drives) to enable playback of multimedia content residing on the computer readable medium 922, and as explained above, may interface with the image capture device 924, as well as other devices, such as remote alarms, locking/unlocking devices (e.g., electromagnetic devices), etc.

The network interface device 906 comprises various components used to transmit and/or receive data over a network environment. By way of example, the network interface device 906 may include a device that can communicate with both inputs and outputs, for instance, a modulator/demodulator (e.g., a modem), wireless (e.g., radio frequency (RF)) transceiver, a telephonic interface, a bridge, a router, network card, etc. The computing system 900 may further comprise mass storage (not shown). For some embodiments, the mass storage may include a data structure (e.g., database) to store image files (and other data files, including identifying information such as name, passwords, pins, etc.) of authorized users for comparison during the authentication process. In some embodiments, the image and data files of authorized users may be located in a remote storage device (e.g., network storage).

The display device 908 may comprise a computer monitor or a plasma screen for a PC or a liquid crystal display (LCD) on a hand held device, head-mount device, or other computing device. In some embodiments, the display device 908 may be separate from the computing system 900, and in some embodiments, integrated in the computing device.

In the context of this disclosure, a "computer-readable medium" stores one or more programs and data for use by or in connection with the instruction execution system, apparatus, or device. The computer readable medium is non-transitory, and may be, for example, but not limited to, an electronic, magnetic, optical, electromagnetic, infrared, or semiconductor system, apparatus, or device. More specific examples (a non-exhaustive list) of the computer-readable medium may include, in addition to those set forth above, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

Figure 10:
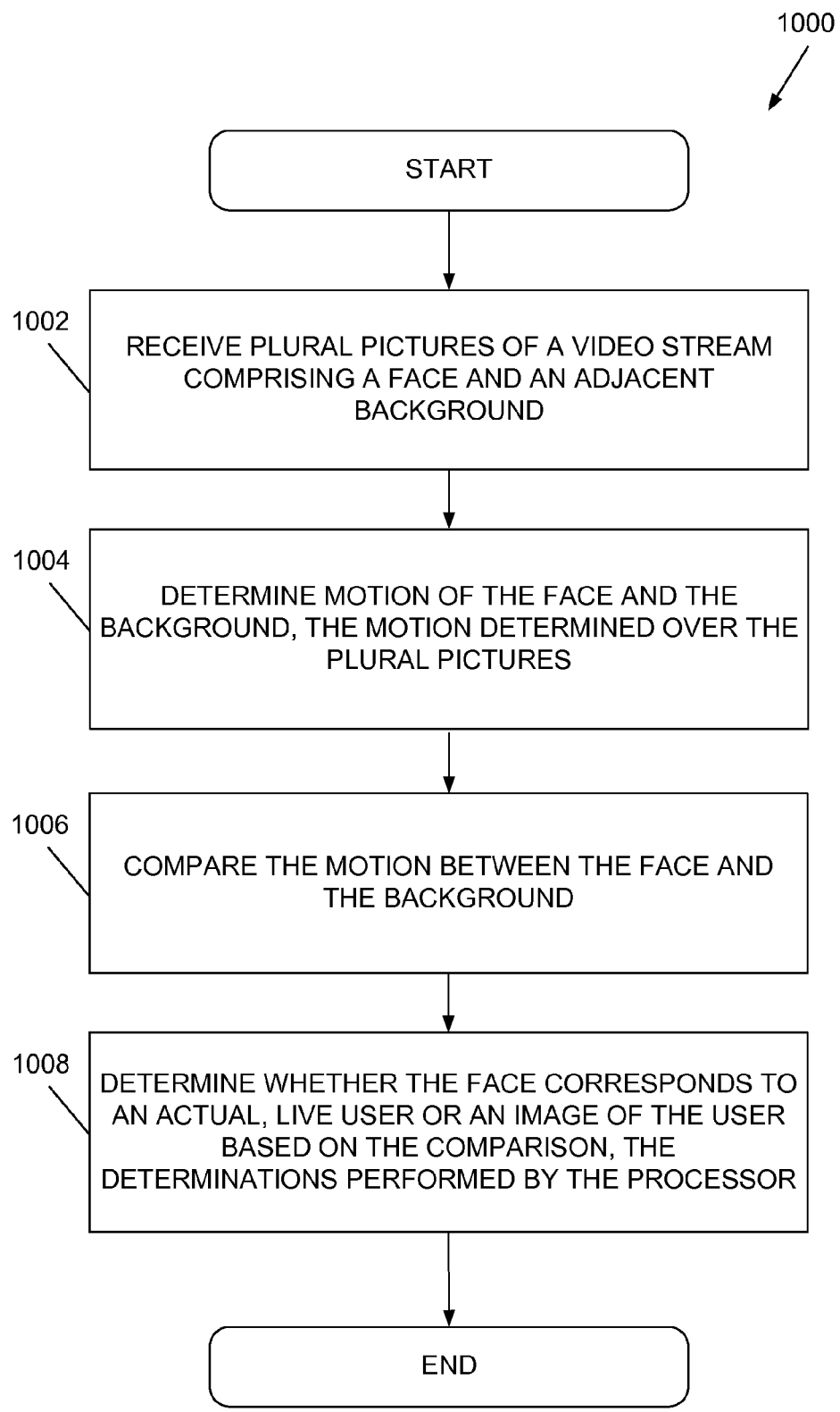
FIG. 10 is a flow diagram of an example embodiment of a liveness detection method based on a difference in motion between a face and a background adjacent the face between plural pictures.

Having provided a detailed description of certain embodiments of liveness detection systems and methods, it should be appreciated that one embodiment of a liveness detection method 1000, implemented by a processor 902 in the computing system 900 and depicted in FIG. 10, comprises receiving plural pictures of a video stream comprising a face and an adjacent background (1002); determining motion of the face and the background, the motion determined over the plural pictures (1004); comparing the motion between the face and the background (1006); and determining whether the face corresponds to an actual, live user or an image of the user based on the comparison, the determinations performed by the processor (1008).

Figure 11:
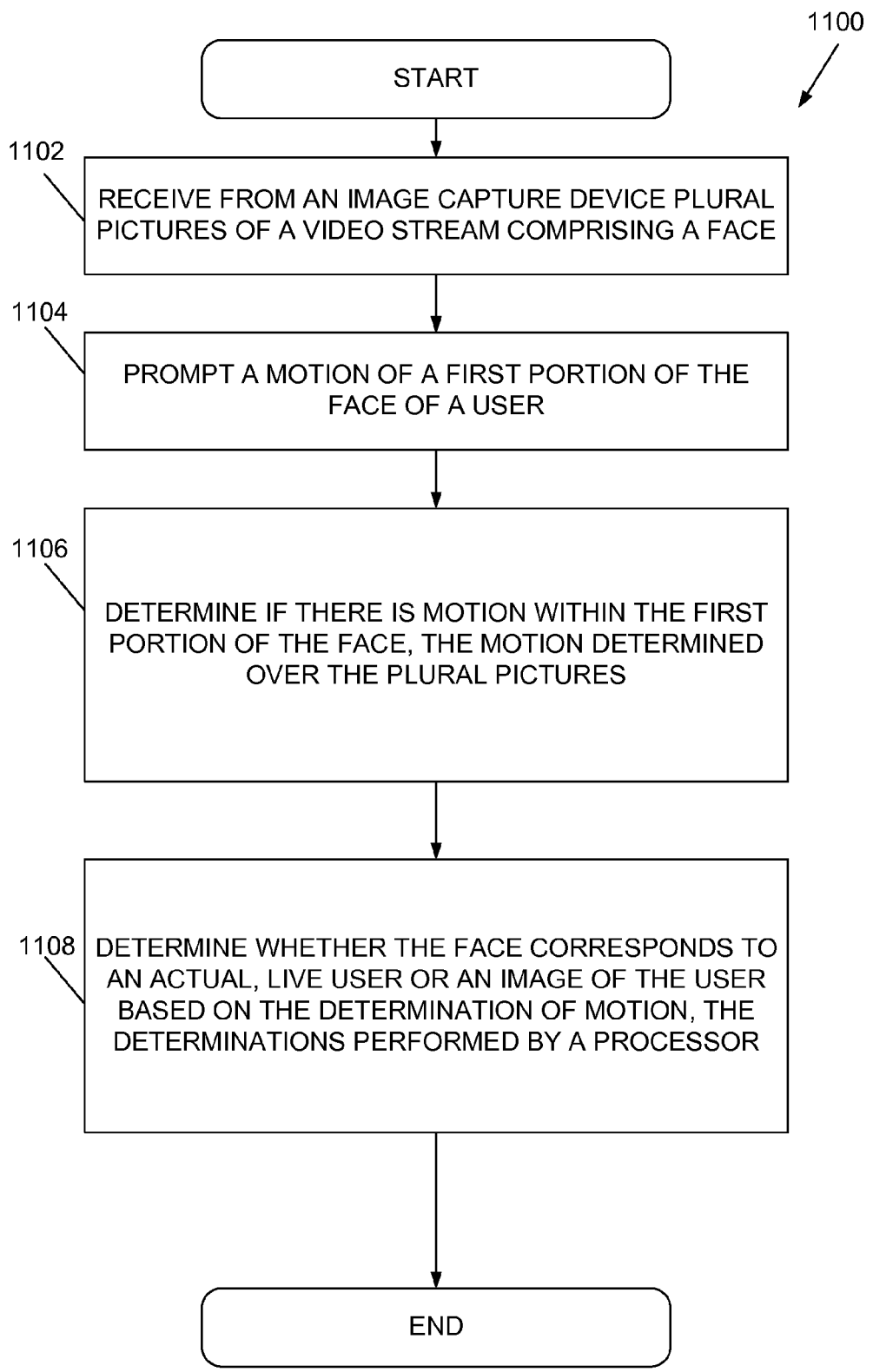
FIG. 11 is a flow diagram of an example embodiment of a liveness detection method based on a difference in motion within a face, such as through a detection of changes in facial features between plural pictures after prompting motion of a user.

In view of the foregoing disclosure, it should be appreciated that another embodiment of a liveness detection method 1100, implemented by the processor 902 in the computing system 900 and depicted in FIG. 11, comprises receiving from an image capture device plural pictures of a video stream comprising a face (1102); prompting a motion of a first portion of the face of a user (1104); determining if there is motion within the first portion of the face, the motion determined over the plural pictures (1106); and determining whether the face corresponds to an actual, live user or an image of the user based on the determination of motion, the determinations performed by a processor (1108). Moreover, a second portion can further be determined, wherein the first portion and second portion of the face may refer to different features of the face where motion may be detected. For instance, in one embodiment, the first portion may be the eyes, and the second portion may be the mouth, or vice versa. Other regions of the face are also contemplated for detection of motion, such as the eyebrows, nose, forehead (e.g., wrinkle), etc.

Any process descriptions or blocks in flow diagrams should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, and/or with one or more functions omitted in some embodiments, depending on the functionality involved, as would be understood by those reasonably skilled in the art of the present disclosure. Also, though certain architectures are illustrated in the present disclosure, it should be appreciated that the methods described herein are not necessarily limited to the disclosed architectures.

In addition, though various delineations in software logic have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of certain liveness detection systems, it should be understood that not every embodiment necessarily provides every benefit/advantage.

In addition, the scope of certain embodiments of the present disclosure includes embodying the functionality of certain embodiments of a liveness detection system in logic embodied in hardware and/or software-configured mediums. For instance, though described in software configured mediums, it should be appreciated that one or more of the liveness detection system and method functionality described herein may be implemented in hardware or a combination of both hardware and software.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A liveness detection method, comprising:
    receiving plural pictures of a video stream comprising a face and an adjacent background;
    determining motion of both the face and the background, the motion determined over the plural pictures, wherein determining the motion of both the face and the background comprises:
    dividing the pictures into plural sub-units of one or more predetermined sizes; and
    implementing motion estimation for at least one of the plural sub-units between the plural pictures;
    comparing the motion between the face and the background, wherein comparing the motion between the face and the background comprises comparing a magnitude and direction of the motion for plural sub-units of the face with a magnitude and direction of the motion for plural sub-units of the background, wherein the magnitude and direction are based on motion estimation of the plural sub-units of the face and the background; and
    determining whether the face corresponds to an actual, live user or an image of the user based on the comparison, the determinations performed by a processor, wherein determining whether the face corresponds to the actual, live user or the image of the user comprises determining whether or not there is a threshold degree of similarity in the magnitude and direction of the motion of the plural sub-units motion of the face compared to the background.

2. The method of claim 1, further comprising detecting the face and determining a size and location of the face.

3. The method of claim 1, further comprising detecting the background, wherein detecting the background comprises implementing:
    detecting a face region;
    estimating a head region according to the face region; and
    determining a background region close to the face region excluding the head region.

4. The method of claim 1, further comprising determining that the face corresponds to the actual, live user responsive to a determination that there is the threshold degree of similarity.

5. The method of claim 1, further comprising determining that the face corresponds to the image of the user responsive to a determination that there is not a threshold degree of similarity.

6. The method of claim 1, further comprising prompting the motion of the user, wherein prompting the motion of the user comprises generating a message to the user, inducing a specific action of the user, or a combination of both.

7. The method of claim 6, wherein generating the message is a text, image, or voice command requesting that the user make the specific action.

8. The method of claim 6, wherein inducing the specific action of the user comprises causing the specific action, wherein the specific action includes a reflexive movement of the user based on non-textual, non-verbal, external stimuli.

9. The method of claim 6, wherein determining whether the face corresponds to the actual, live user or the image of the user is based on the comparison based on the motion prompted by the prompted motion.

10. The method of claim 1, wherein receiving plural pictures of the video stream comprising receiving from an image capture device.

11. A liveness detection system, comprising:
    an image capture device configured to receive plural pictures of a video stream comprising a face and an adjacent background; and
    a computing device comprising a processor that is configured to:
    determine motion of both the face and the background, the motion determined over the plural pictures, wherein the processor determines the motion of both the face and the background by dividing the pictures into plural sub-units one or more predetermined sizes and implementing motion estimation for at least one of the plural sub-units between the plural pictures;
    compare the motion between the face and the background and within at least a portion of the face, wherein the processor compares the motion between the face and the background by comparing a magnitude and direction of the motion for plural sub-units of the face with a magnitude and direction of the motion for plural sub-units of the background, wherein the magnitude and direction are based on motion estimation of the plural sub-units of the face and the background; and
    determine whether the face corresponds to an actual, live user or an image of the user based on the comparisons, wherein the processor determines whether the face corresponds to the actual, live user or the image of the user by determining whether or not there is a threshold degree of similarity in the magnitude and direction of the motion of the plural sub-units motion of the face compared to the background.

12. The system of claim 11, wherein responsive to a determination that the face corresponds to a live user, the processor is further configured to further authenticate the user.

13. A liveness detection method, comprising:
receiving plural pictures of a video stream comprising a face and a background;
dividing the plural pictures into plural sub-units of one or more predetermined sizes;
determining a magnitude and direction of motion for each of the plural sub-units;
identifying respective sub-units of the face and of the background;
comparing a magnitude and direction of the motion for plural sub-units of the face with a magnitude and direction of the motion for plural sub-units of the background; and
determining whether the face corresponds to an actual, live user or an image of the user based on whether a majority of the sub-units of the face have a magnitude and direction of motion that are within a threshold degree of similarity with respect to a magnitude and direction of motion of a majority of the sub-units of the background.

14. The method of claim 13, further comprising inducing the motion by displaying a moving graphic pattern on a display.

* * * * *